United States Patent Office 3,181,897
Patented May 4, 1965

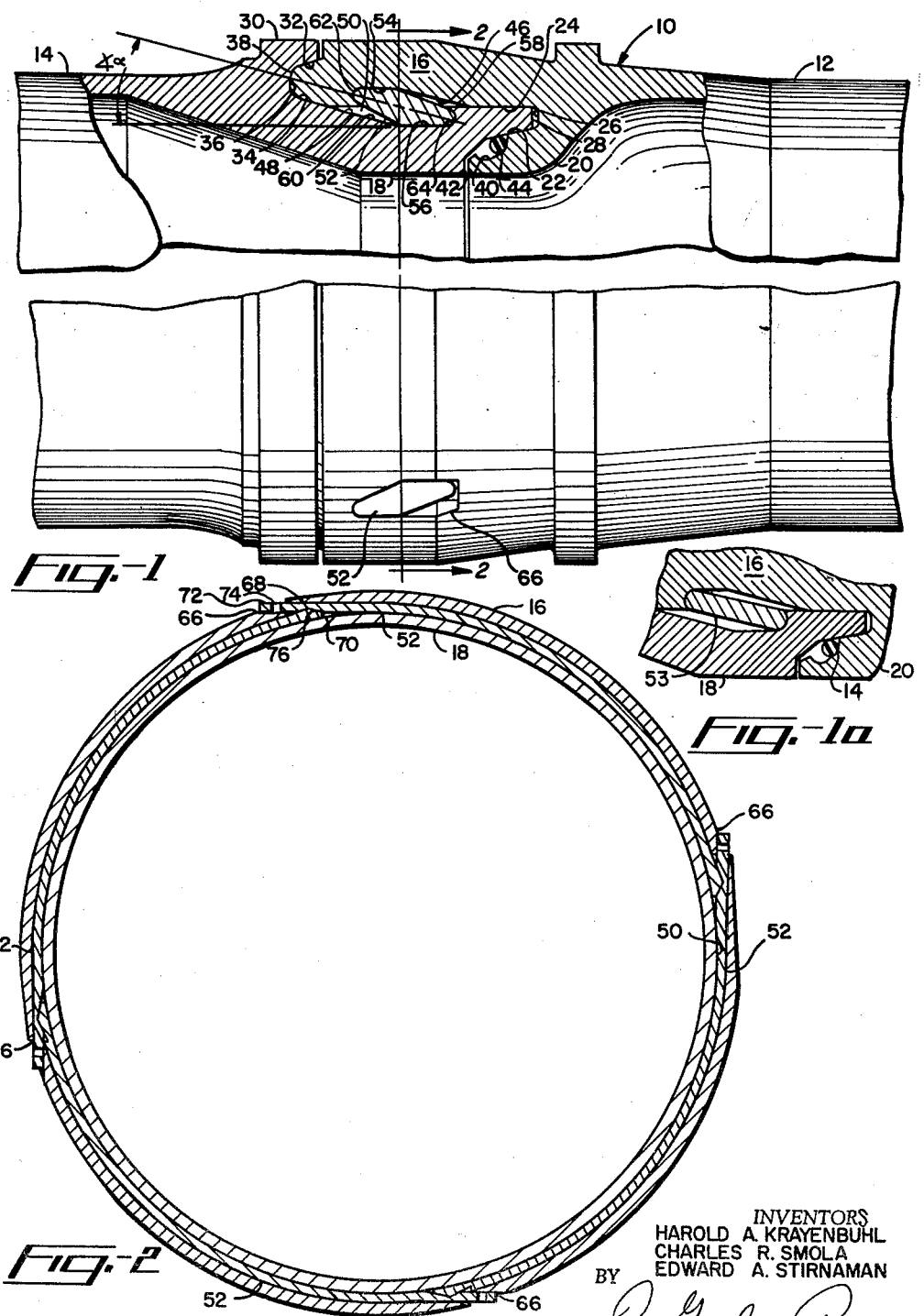

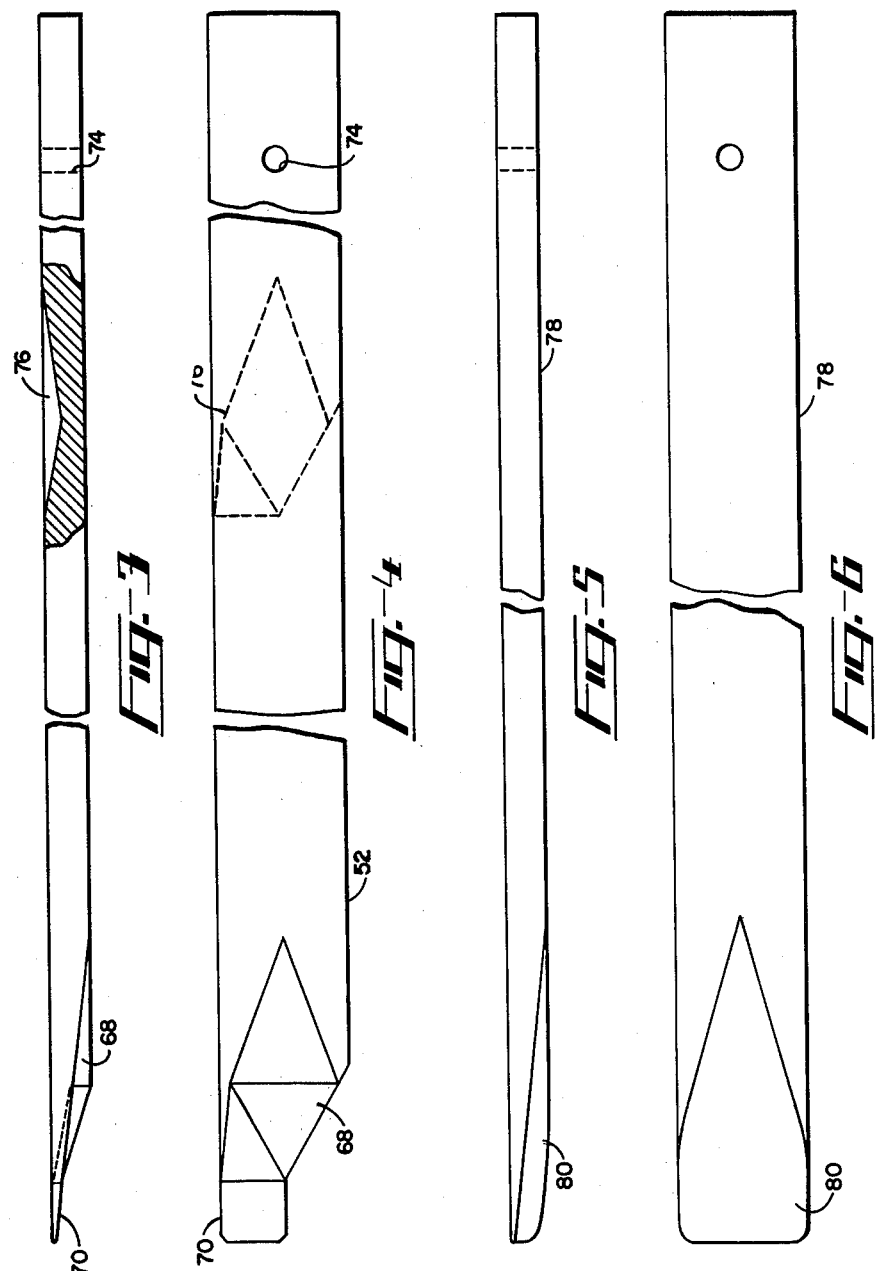

3,181,897
MECHANICAL JOINT FOR CONNECTING
MEMBERS TOGETHER
Harold A. Krayenbuhl, Fair Oaks, Edward A. Stirnaman, Carmichael, and Charles R. Smola, Sacramento, Calif., assignors to Aerojet-General Corporation, Azusa, Calif., a corporation of Ohio
Filed Apr. 16, 1962, Ser. No. 188,925
1 Claim. (Cl. 285—81)

This invention relates to a mechanical joint and in particular to a mechanical joint for locking two cylindrical segments of a pressure vessel.

A general object of the present invention is to provide a simple, light weight mechanical joint for two cylindrical segments of a pressure vessel which joint is easy to fabricate, assemble and disassemble.

Another object of the invention is to provide a mechanical joint for a pressure vessel wherein locking elements are positioned within the outer surface of the pressure vessel.

In its principal aspect, the present invention comprises a pressure vessel having two cylindrical segments, one of which has a portion which surrounds and telescopically receives the end portion of the other segment. Annular grooves are cut in the overlapping surfaces of the telescopically mounted segments which grooves together form a common groove. Preferably, a plurality of access openings are provided in one of the segments of the pressure vessel through which a plurality of locking elements may be inserted into the common groove. The locking elements are elongated flexible metallic strips which are positioned in the common groove in such a manner so that the two cylindrical segments are effectively joined together. What is provided, therefore, is a simple, light weight mechanical joint wherein the locking elements are positioned within the outer surface of the pressure vessel so that the outer surface of the pressure vessel may have a relatively smooth contour.

Other objects, aspects, and advantages will become apparent from the following description in connection with the accompanying drawings, wherein:

FIGURE 1 is a fragmentary side view partially in section of the invention;

FIGURE 1A is a fragmentary view of FIGURE 1 showing an embodiment of the locking element;

FIGURE 2 is a sectional view taken on line 2—2 of FIGURE 1 with the thickness of the parts being shown out of proportion for purposes of clarity;

FIGURE 3 is a fragmentary side view partially in section of the locking element of this invention illustrated in FIGURE 1;

FIGURE 4 is a fragmentary bottom view of the locking element in FIGURE 3;

FIGURE 5 is a fragmentary side view of an additional embodiment of the locking element of the invention; and FIGURE 6 is a fragmentary bottom view of the locking element in FIGURE 5.

Referring now to the drawings, wherein like reference characters designate like or corresponding parts throughout the various views, there is shown in FIGURE 1 a portion of a pressure vessel 10. The pressure vessel includes a first cylindrical segment 12 and a second cylindrical segment 14 which are desired to be joined together. The cylindrical segment 12 has an axially extending portion 16 which surrounds and telescopically receives an end portion 18 of the second cylindrical segment 14.

In order to effectively engage and position the ends of these two segments 12 and 14 before locking them together, a type of tongue and groove arrangement is provided. To this end, there is provided on the first cylindrical segment 12 an axially extending annular flange 20, the outer periphery 22 of the flange being spaced radially inwardly from the inner periphery 24 of the axially extending portion 16, thus providing a groove 26 for receiving a nose portion 28 on the end of the second cylindrical segment 14. Segment 14 also has an axially extending annular flange 30, the inner periphery 32 of which is spaced radially outwardly from the outer periphery 34 of the end portion 18 of the second segment 14. This configuration also provides a groove 36 for receiving a nose portion 38 on the end of the first segment 12. Relatively close tolerances are maintained between the grooves 26 and 36 and the nose portions 28 and 38, respectively, in order to minimize deflection of the cylindrical segments 12 and 14 when the pressure vessel is under load.

It is preferable that the outer periphery 22 of the annular flange 20 on the first segment 12 be provided with an annular groove 40 which is in communication with the interior of the pressure vessel through the gap 42 between the ends of the two segments. A sealing ring, preferably of rubber, is positioned within the groove 40. It can be appreciated that pressure within the vessel 10 will act against the sealing ring 44 through the gap 42 so as to prevent leakage between the outer periphery 22 of flange 20 and the inner periphery of the nose portion 28 of segment 14. By this arrangement, an effective sealing means is provided between the two segments 12 and 14 of the pressure vessel.

Referring now to the details of the locking arrangement for the two segments 12 and 14, as best seen in FIGURE 1, there is provided an annular groove 46 in the inner periphery of the axially extending portion 16 of the first segment 12. Axially aligned with that groove is a second annular groove 48 cut in the outer periphery of the end portion 18 of the second segment 14. These two axially aligned grooves together provide a common groove 50 for receiving an elongated locking element 52 to be described in greater detail hereinbelow. The common groove 50 may have a generally diamond-shaped cross-section with axially extending surfaces 54 and 56 and slanted surfaces 58 and 60. The portion of the groove 50 nearest the end of axially extending portion 16 of the first segment is rounded at 62 and, likewise, the end of the groove nearest the end of nose portion 28 of the second segment 14 is rounded at 64 for purposes as will be more clearly seen hereinbelow.

Reference is now made to FIGURE 2 which is shown somewhat out of proportion in that the thickness of the parts illustrated therein is greater with respect to the diameter of the segments than would be practical in the normal application of the invention but is shown in this manner so that the details may be more clearly seen. In order to join the two segments 12 and 14, elongated locking elements 52 are inserted into the annular common groove 50 through access openings 66 which extend through the axially extending portion 16 of the first segment 12. Although four locking elements 52 and four access openings 66 have been shown in FIGURE 2, it is to be understood that any number of elements and openings may be provided, depending upon the diameter of the pressure vessel being used. In the embodiment of the invention illustrated in the drawings, four locking elements 52 are shown, it having been found that four such elements are optimum for a hundred inch diameter pressure vessel. Each access opening 66 cut in the axially extending portion 16 of the first cylindrical segment 12 extends in a tangential direction with respect to the common groove 50 so that a locking element 52 may be easily inserted through the access opening 66 into the groove.

The locking element 52 is preferably made from a flexible metallic material which permits the element to deform or flex along the longitudinal extent of the element so that it will adapt itself to the curvature of groove 50. As seen in FIGURE 1, the locking element is preferably diamond-shaped in cross-section and generally conforms to the shape of the common groove 50 provided between the two cylindrical segments 12 and 14. However, the locking element may have a generally rectangular cross-section as indicated by numeral 53 in FIGURE 1A. The locking element 52 is positioned in the groove 50 so that its transverse axis extends at an acute angle to the axis of the pressure vessel 10. This angle, indicated by α in FIGURE 1 is preferably within the range of about 10° to about 20°, it being appreciated that the smaller the angle, the greater locking effect the element 52 will have on the two segments 12 and 14. It is seen that all four of the locking elements illustrated in FIGURE 2 have the same shape and are of equal length. The diamond-shaped cross-section of the locking element is advantageous in that it permits removal of unnecessary material on the element when being pushed into groove 50 and at the same time provides additional material at critical stress areas of the joint without sacrifice to the over-all joint cross-section. The sides of the locking element 52 are rounded in order that they will be well seated in the rounded ends 62 and 64 of the groove 50. This insures the correct positioning of the element in the groove 50 during assembly and provides adequate bearing surfaces between the segments and locking element under all loading and dimensional tolerance conditions so that transmission of axial forces from one segment to the other is almost entirely through the locking element 52.

The over-all shape and configuration of the locking element of FIGURE 1 is best seen in FIGURES 3 and 4. The forward outer periphery of the locking element is beveled at 68 and a relatively thin rib portion 70 is provided at the very end thereof. The advantage of this beveled portion is most clearly seen in FIGURE 2 where it can be appreciated that, due to the bevel, the front end of one locking element 52 may be snugly seated underneath the rear end 72 of a preceding locking element. It can be readily appreciated that by this arrangement the groove 50 will be nearly completely filled with solid metallic material so that the joint may withstand large loads. The locking element 52 is of such a length that the rear end 72 protrudes slightly from the access opening 66. Therefore, an opening 74 in the rear end of the locking element is available so that one may withdraw the locking element from the groove when desired. It is also desirable to provide a cut-out portion 76 in the side of the locking element opposite the side in which the beveled front end 68 is provided. This cut-out portion has the same configuration as the beveled forward portion 68 so that beveled portion 68 of one locking element may be essentially interlocked with the cut-out portion 76 of a preceding locking element. It can also be appreciated that the rib portion 70 will fill the space provided between the underside of the locking element and the slanted surface 60 of the annular groove 48 cut in the end portion 18 of the second cylindrical segment 14.

Another embodiment of the locking element is shown in FIGURES 5 and 6 and is designated by numeral 78. This locking element differs only in the configuration of the beveled forward outer end, it being somewhat simplified in comparision to the locking element illustrated in FIGURES 3 and 4. However, it is appreciated that the beveled front end 80 of the locking element 78 will be snugly fitted underneath the underside of a preceding locking element in the same manner as the locking element 52.

In order to join the two cylindrical segments 12 and 14 of the pressure vessel, it is first necessary to telescopically mount the first segment 12 on the second segment 14 so that the annular grooves 46 and 48 will be axially aligned and the nose portions 28 and 38 will be snugly seated in the grooves 26 and 36, respectively. Then, one locking element 52 may be inserted through an access opening 66 with the front beveled end 68 lying upwardly so that when the locking element is in the groove 50, the beveled portion 68 will be on the outer periphery of the locking element. The locking element may be forced into the groove by using any suitable impact device, such as a pneumatic hammer. It can be appreciated that since the cylindrical segments are quite large, for example on the order of a hundred inches in diameter, that each of the locking elements will be possibly 80 inches long. Therefore, even though the locking element has a rather heavy cross-section, its length is of such an extent that by the inherent flexibility of the metallic material, the locking element will be capable of being flexed so as to conform to the shape of the common groove 50 between the two cylindrical segments 12 and 14.

Once one locking element is hammered into place, a second element may be inserted through a rearwardly positioned access opening 66 and driven into the common groove until the front portion thereof is snugly seated underneath the rear end 72 of the preceding locking element which protrudes slightly out of the access opening 66 and extends in a tangential direction. The remaining locking elements are inserted in the same manner until they are all positioned in the common groove 50 and snugly fitted one against the other to provide a nearly continuous locking ring within the groove. It can be appreciated by this arrangement, that the locking elements may be very quickly inserted into the groove 50 to join the two segments 12 and 14 together. It is also seen that by this arrangement, wherein the locking elements are inside the outer surface of the pressure vessel 10, the segments 12 and 14 may be assembled to form an aerodynamically smooth contour which would be of importance if the pressure vessel were used for flight in the atmosphere where friction drag must be kept to a minimum.

It will of course be understood that various changes can be made in the form, details, arrangement, and proportions of the various parts without departing from the spirit and scope of the invention as defined by the appended claim.

We claim:

In combination, a first member, a second member coaxial with said first member, said first member having an axially extending tubular portion surrounding an end portion of said second member, said axially extending tubular portion and said end portion having continuous grooves formed in their inner and outer peripheries, respectively, for defining a common groove therebetween, said axially extending tubular portion of said first member having a plurality of openings therethrough in radial alinement with said common groove to provide access thereto, said openings being spaced about the periphery of said axially extending tubular portion and extending tangentially with respect to said common groove, a plurality of removable elongated elements equal in number to said plurality of openings lying in said common groove for retaining said first and second members in fixed relation, the rear end of each of said elongated elements protruding through the opening corresponding thereto and thereby lying in a tangential direction with respect to said common groove, and the forward outer periphery of each of said elongated elements having formed thereon latching means consisting of at least two oppositely sloping faces and the rear inner periphery of each of said elongated elements having latching means thereon formed complementary to said first mentioned latching means so that the forward and rear end portions of adjacent elongated elements are releasably interlocked in snugly fitting relationship when forced into overlapping position.

References Cited by the Examiner

UNITED STATES PATENTS

| | | | |
|---|---|---|---|
| 906,849 | 12/08 | Baashuus | 285—113 |
| 2,597,482 | 5/52 | Harrison et al. | 285—305 |
| 3,065,005 | 11/62 | Hall et al. | 287—52 |
| 3,092,962 | 6/63 | Wood | 285—305 |

FOREIGN PATENTS

| | | |
|---|---|---|
| 1,243,193 | 8/60 | France. |
| 874,954 | 4/53 | Germany. |
| 730,339 | 5/55 | Great Britain. |

CARL W. TOMLIN, *Primary Examiner.*